United States Patent
Kwok

(10) Patent No.: US 11,330,471 B2
(45) Date of Patent: May 10, 2022

(54) SIMULTANEOUS MULTI-PATH UPLINK TRANSMISSIONS TO A TELECOMMUNICATIONS NETWORK

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/908,445

(22) Filed: Jun. 22, 2020

(65) Prior Publication Data
US 2021/0400533 A1    Dec. 23, 2021

(51) Int. Cl.
H04W 72/12    (2009.01)
H04W 28/08    (2009.01)
H04W 76/15    (2018.01)
H04W 88/06    (2009.01)

(52) U.S. Cl.
CPC ... *H04W 28/0819* (2020.05); *H04W 28/0858* (2020.05); *H04W 72/1215* (2013.01); *H04W 72/1268* (2013.01); *H04W 72/1284* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,553,438 B1 * | 4/2003 | Coffman | G06F 9/544 709/248 |
| 7,260,404 B2 * | 8/2007 | Utakouji | H04W 16/10 455/452.1 |
| 8,472,383 B1 * | 6/2013 | Banerjea | H04B 7/0697 370/328 |

(Continued)

FOREIGN PATENT DOCUMENTS

| | | |
|---|---|---|
| EP | 3737145 A1 | 11/2020 |
| WO | 2019030077 A1 | 2/2019 |
| WO | 2019141239 A1 | 7/2019 |

OTHER PUBLICATIONS

Ondrusova, et al. 5G Implementation Guidelines: NSA Option 3. GSMA, Version 2.1, Feb. 14, 2020 [retrieved on Jun. 22, 2020] Retrieved from the Internet URL: https://www.gsma.com/futurenetworks/wp-content/uploads/2019/03/5G-Implementation-Guidelines-NSA-Option-3-v2.1.pdf.

(Continued)

*Primary Examiner* — Nathan S Taylor
(74) *Attorney, Agent, or Firm* — Han Santos, PLLC

(57) ABSTRACT

This disclosure describes systems, devices, and computer-implemented methods that facilitate the simultaneous transmission of subsets of user plane data to a telecommunications network via two or more uplink transmission paths. More specifically, a mobile device may detect user plane data within a buffer pool and in doing so, transmit a resource allocation request for the uplink transmission of the user plane data. In response, the mobile device may receive a set (Continued)

of control plane data associated with the uplink transmission via two or more uplink transmission paths. The mobile device may simultaneously transmit subsets of user plane data to the telecommunications network via multiple base station nodes, based at least in part on the control plane data.

20 Claims, 8 Drawing Sheets

(56) References Cited

U.S. PATENT DOCUMENTS

| | | | |
|---|---|---|---|
| 2009/0310556 A1* | 12/2009 | Ishii | H04W 56/0045 370/329 |
| 2016/0139639 A1* | 5/2016 | Dash | G06F 3/0688 714/773 |
| 2017/0111911 A1* | 4/2017 | Uchino | H04W 28/16 |
| 2018/0103402 A1* | 4/2018 | Susitaival | H04L 61/6022 |
| 2018/0176974 A1* | 6/2018 | Fujishiro | H04W 88/06 |
| 2019/0037443 A1* | 1/2019 | Lee | H04L 47/34 |
| 2020/0007664 A1* | 1/2020 | Kanugovi | H04L 45/24 |
| 2020/0351700 A1* | 11/2020 | Han | H04W 72/08 |
| 2020/0367155 A1* | 11/2020 | Kanugovi | H04L 69/14 |
| 2021/0153199 A1* | 5/2021 | Wong | H04B 17/318 |

OTHER PUBLICATIONS

Wang, et al. 5G Implementation Guidelines: SA Option 2. GSMA, Version 1.2, Feb. 7, 2020 [retrieved on Jun. 22, 2020] Retrieved from the Internet URL: https://www.gsma.com/futurenetworks/wp-content/uploads/2020/02/5G-SA-Option-2-ImplementationGuideline-v1.2.pdf.

European Patent Application 21178075.4, Search Report dated Nov. 22, 2021, 9 pages.

* cited by examiner

SIMULTANEOUS MULTI-PATH UPLINK TRANSMISSIONS TO A TELECOMMUNICATIONS NETWORK

BACKGROUND

Telecommunication service providers are continually deploying new Radio Access Technologies (RAT) that provide consumers with a broad range of enhanced features and capabilities. During the initial phase of deploying a new RAT, such as the 5G-New Radio (5G-NR), service providers are tasked with deploying the necessary physical infrastructure, such as base station nodes (i.e. gNodeBs) and 5GC core networks. During this initial phase, early consumer adopters can be confronted with piece-meal new RAT coverage that supports some, but not all, enhanced features and capabilities.

To help alleviate some frustration of a piece-meal deployment, mobile devices can be configured to use more than one RAT, namely the legacy RAT (i.e. Long-Term Evolution (LTE)) and the newly deployed RAT (i.e. 5G-NR). While this configuration provides mobile devices with an ability to maintain nominal coverage, equivalent to the legacy network, only one RAT can be used at any one time. For example, a mobile device that is configured to use the Long-Term Evolution (LTE) and the 5G-New Radio (5G-NR) networks, can only transmit user plane data to its core network via the LTE network (i.e. an eNodeB) or the 5G-NR network (i.e. a gNodeB), but not both.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a schematic view of a computing environment configured for a Non-Stand Alone (NSA) deployment of a new Radio Access Technology (RAT), and FIG. 1B illustrates a schematic view of a computing environment configured for a Stand Alone (SA) computing environment of a new RAT.

FIG. 2A illustrates a general flow of communications for an NSA deployment of a new RAT and FIG. 2B illustrates a general flow of communications for an SA deployment of a new RAT.

DETAILED DESCRIPTION

Figure 1A:
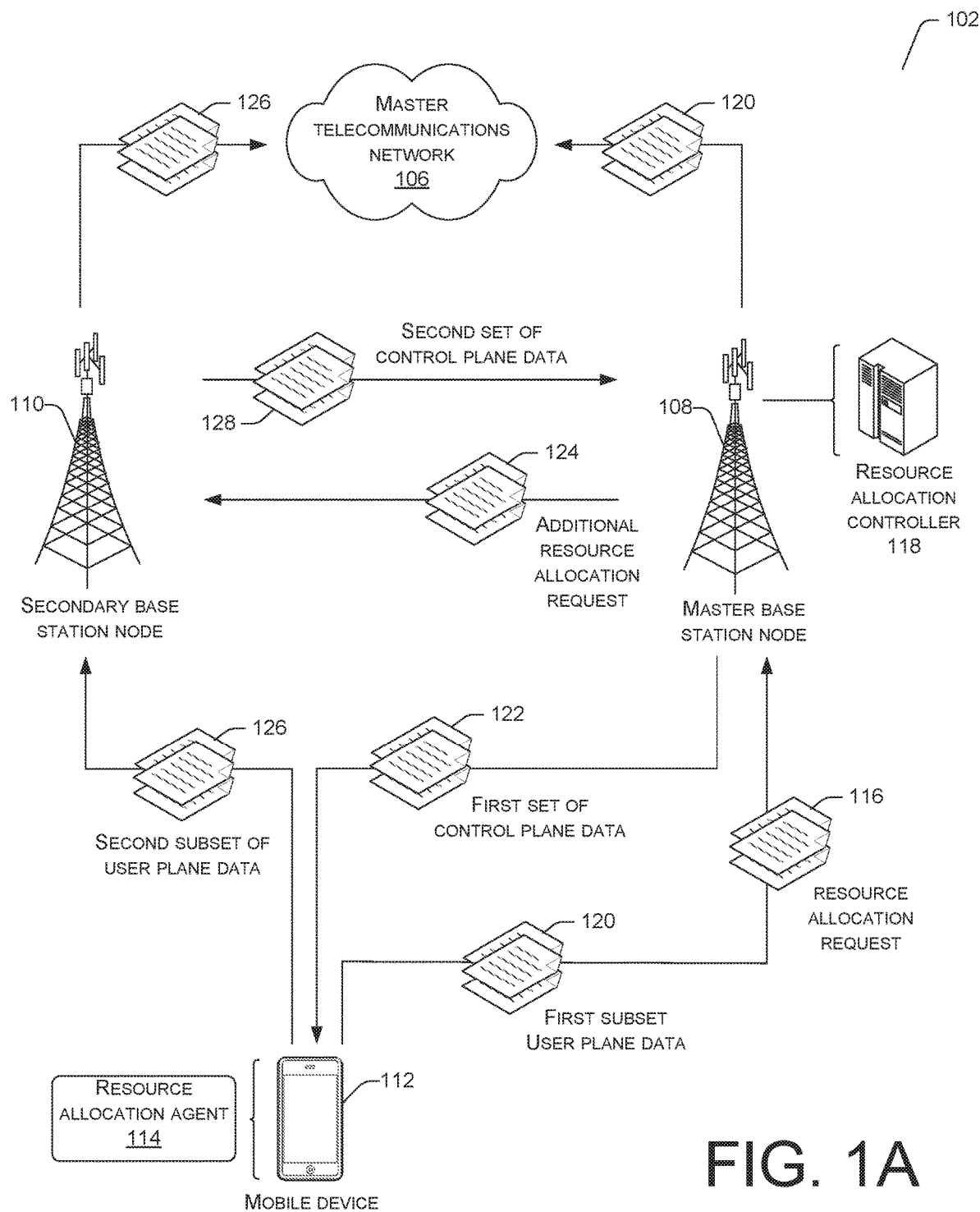
FIGS. 1A and 1B illustrate computing environments that facilitate the simultaneous uplink transmission of subsets of user plane data to a telecommunications network.

This disclosure describes techniques for enabling mobile devices to leverage more than one uplink data path for transmissions to a telecommunications network. During the initial deployment phase of a new generation of radio access technology (RAT), such as 5G-New Radio (5G-NR), a mobile device may be configured to support a legacy RAT and the new RAT. The legacy RAT is intended to provide consumers with a baseline quality of service (QoS) in regions where new RAT infrastructure is yet to be deployed.

Presently, however, even though mobile devices may be configured to use more than one RAT (i.e. LTE and 5G-NR), only one RAT can be used at any one time for uplink transmissions to a core network. For example, a mobile device that is configured to use the LTE and the 5G-NR networks may transmit user plane data to a core network via an eNodeB (i.e. LTE base station node) associated with the LTE network, or a gNodeB (i.e. 5G-NR base station node) associated with the 5G-NR network, but not both.

This disclosure describes techniques that enable a mobile device to simultaneously transmit multiple subsets of user plane data via more than one RAN (i.e. eNodeB and/or gNodeB) to a core network. In other words, an uplink transmission of user plane data may be split into subsets of user plane data that are simultaneously transmitted, via an eNodeB and/or a gNodeB, to the core network of a legacy or new RAT (i.e. Evolved Packet Core (EPC) for an LTE network or 5GC for 5G-NR network). At the RAN, the core network may receive and aggregate the subsets of user plane data to re-form the original user plane data.

By way of example, subsets of user plane data may be simultaneously transmitted to an EPC of the LTE network via at least one eNodeB and at least one gNodeB. Alternatively, the subsets of user plane data may be transmitted to the EPC via multiple RANs of the same RAT, such as more than one eNodeB or more than one gNodeB. In another example, subsets of user plane data may be simultaneously transmitted to a 5GC core of the 5G-NR network via at least one eNode B and at least one gNodeB. Alternatively, the subsets of user plane data may be transmitted to the 5GC core via more than one eNodeB or more than one gNodeB.

Additionally, this disclosure describes techniques that are intended to leverage different deployment methodologies of a new RAT (i.e. 5G-NR) into a marketplace. Deployment methodologies may include a standalone (SA) option and a non-standalone (NSA) option, each of which is described in more detail with reference to FIG. 1. Briefly, the NSA deployment option leverages an existing deployment of a legacy RAT infrastructure to deploy a new RAT. For example, 5G-NR user plane and control plane data may be transmitted via eNodeBs of an LTE network or gNodeBs of the newly deployed 5G-NR network. In contrast, the SA deployment option is configured to transmit user plane and control-plane data using the newly deployed infrastructure, which is independent of legacy infrastructure. For example, 5G-NR user plane and control plane data may be transmitted via the newly deployed gNodeBs of the 5G-NR network and independent of the eNodeBs of the LTE network.

Referring to the NSA deployment option, a mobile device may transmit a resource allocation request to a master base station node for an uplink transmission of user plane data to a primary core network. The master base station node may employ the same RAT as the primary core network. For example, the mobile device may transmit the resource allocation request to an eNodeB (i.e. master base station node) that is intended for an uplink transmission to an Evolved Packet Core (EPC) of an LTE network. Similarly, a gNodeB (i.e. master base station node) may receive the resource allocation request for an uplink transmission to a 5GC of a 5G-NR network.

Referring to the SA deployment option, the mobile device may transmit a resource allocation request to base station nodes associated with each standalone telecommunication network (i.e. LTE and 5G-NR). The mobile device may transmit a first resource allocation request to an eNodeB (i.e. master base station node) for an uplink transmission to an EPC of an LTE network and transmit a second resource allocation request to a gNodeB (i.e. master base station node) for an uplink transmission to a 5GC of a 5G-NR network. Note that under the SA deployment option, there are no secondary base station nodes, however, the term "master base station node" is used when describing the SA deployment option to emphasize parallels with the NSA deployment option.

In some embodiments, an additional base station node may be used to relay control plane signaling to the mobile device. For example, a "master-control plane" base station node (i.e. gNodeB for a 5G-NR network or eNodeB for an LTE network) may receive a resource allocation request from a mobile device. The master-control plane base station may coordinate with the master base station node and the secondary base station node(s) that are tasked with downlink and uplink data transmissions to the telecommunications network. In effect, this embodiment serves to isolate control plane signaling to a separate base station node from the base station nodes responsible for the simultaneous uplink transmission of user plane data to a telecommunications network.

In at least the NSA deployment option, the resource allocation request may be intercepted by a resource allocation controller that resides at the master base station node(s). The resource allocation controller may determine the available spectrum to support a resource allocation at the master base station node and secondary base station node(s). In doing so, the resource allocation controller may interact with base station node(s) to help facilitate the transmission of control plane data to the mobile device. More specifically, separate uplink resource allocation requests are sent to, and handled separately by the master radio link of the master base station node and the secondary radio link(s) of the base station node(s).

In response, the mobile device may receive control plane data associated with the uplink transmission of user plane data to the primary core network. The control plane data may indicate a first resource allocation (i.e. PRBs) for an uplink transmission via the master base station node to the primary core network. Under the NSA deployment option, the control plane data may also include additional resource allocation(s) for uplink transmission(s) via secondary base station node(s) to the primary core network. The first resource allocation and the additional resource allocation(s) may be used to transmit subsets of the user plane data to the primary core network. Each subset may comprise a portion, but not all, of the user plane data, such that an aggregate of all subsets corresponds to an entirety of the user plane data. Note that the secondary base station node(s) may employ a different RAT to the master base station node and the primary core network.

Alternatively, under the NSA deployment option, the mobile device may receive a first set of control plane data from the master base station node and additional sets of control plane data from secondary base station node(s), with each set of control plane data outlining the resource allocation scheduled for the uplink transmission via the respective base station nodes to the primary core network. In this example, the master base station node may interact with the secondary base station node(s) to request a resource allocation on behalf of the mobile device based on the resource allocation received at the master base station node. The secondary base station node(s) may selectively transmit the resource allocation directly to the mobile device, rather than relaying the resource allocation to the mobile device via the master base station node.

In response to receiving control plane data, the mobile device may simultaneously transmit subsets of user plane data to the primary core network via multiple base station nodes, based at least in part on the control plane data. Under the SA deployment option, subsets of user plane data are transmitted via master base station node(s) to their respective telecommunications networks (i.e. a master and secondary telecommunications network) and then aggregated at the master telecommunications network. Under the NSA deployment option, the subsets of user plane data are transmitted to and aggregated at, the primary core network via the master and secondary base station node(s). In this way, the primary core network may receive, at near-substantially the same time, subsets of user plane data from multiple base station node(s) that when aggregated, re-form the original user plane data. It is noteworthy that under the NSA deployment option, a gNodeB can communicate with one telecommunications network, namely the master telecommunications network (i.e. LTE or 5G-NR network). Under the SA deployment option, the gNodeB has multiple gateway ends for a 5G-NR session, and can communicate with LTE and 5G-NR telecommunication networks at the same time.

In various examples, the mobile device may include a resource allocation agent that detects uplink transmissions of user plane data on the mobile device that are intended for a primary core network. The resource allocation agent may generate multiple buffer queues that each receive an allocation of user plane data. The user plane data may be queued in each buffer queue as data packets. The data packets are allocated to PRBs within the available RAT (i.e. LTE or 5G-NR) spectrum based on the control plane data. Each buffer queue may receive a subset of user plane data that is intended for an uplink transmission to the primary core network via one of a master or secondary base station node. In other words, the subset of user plane data transmitted to each base station node corresponds to the subset of user plane data queued within a buffer queue. The aggregate of the user plane data in each buffer queue represents an entirety of the user plane data.

The allocation of user plane data to one or more buffer queues may be based at least in part on an assigned priority. Each data packet may be assigned a priority that is used to select an appropriately efficient and reliable uplink transmission path to the primary core network. For example, a data packet with a relatively high priority to other data packets may be assigned to a more reliable, less congested, uplink transmission path. In some examples, data packets with a relatively high priority may be assigned to more than one buffer queue, to create a measure of redundancy that protects against packet loss.

More specifically, the resource allocation agent may monitor receipt of user plane data to an initial, common buffer pool. In this example, substantially all user plane data is received at the common buffer pool. At the common buffer pool, the resource allocation agent may analyze the user plane data to determine a priority for individual data packets and allocate individual data packets to buffer queues based at least in part on their respective priority.

The resource allocation agent may determine a priority for individual data packets based on a number of factors, such as quality of service (QoS) associated with the individual data packets, quality of experience (QoE) associated with the individual data packets, or a combination of both. QoS may correspond to best effort transmissions designations (i.e. non-guaranteed bit-rate data), namely QoS5 through QoS9. QoS5 corresponds to Internet Protocol (IP) Multimedia Subsystem (IMS) signaling; QoS6 corresponds to Transmission Control Protocol (TCP)-based video (buffered streaming); QoS7 corresponds to voice, video (live streaming), and interactive gaming; QoS8 corresponds to TCP-based video (buffering streaming); and, QoS9 corresponds to TCP-Based video (buffered streaming). QoE may be inferred by identifying applications or services currently being executed in the foreground or background of the mobile device.

In a first example, consider determining priority based on QoS. the resource allocation agent may identify the QoS designation and prioritize corresponding data packets based on a user profile of the mobile device. For example, a user profile may indicate that a user typically prioritizes interactive gaming (i.e. QoS7) over TCP-based video (i.e. QoS6). Thus, the resource allocation agent may assign data packets associated with interactive gaming (i.e. QoS7) with a higher priority relative to data packets associated with QoS6. In some examples, the user profile may include a priority ranking of QoS transmissions based on historical records. Priority ranking may be generated using machine-learning algorithms based on historical data usage records.

In a second example, consider determining priority based on QoE. Data packets associated with applications or services being executed in the foreground or background of a mobile device may receive a relatively higher priority to other data packets. Similarly, the resource allocation agent may determine priorities between applications or services being executed in the foreground or background based on a user profile associated with the mobile device. For example, if a user typically prioritizes a streaming service over other data services, the resource allocation agent may assign a higher priority to data streams (i.e. and ensuing data packets) associated with the streaming service relative to the other data services, in the event that streaming service and other data services occur simultaneously.

Throughout this disclosure, the term "user plane data" may collectively refer to "data streams" at the application layer of the mobile device, "data frames" at the data link layer of the mobile device, or "data packets" at the physical layer of the mobile device. The data streams, data frames, and data packets each represent the same user plane data that is configured in different forms at different Open System Interconnection (OSI) layers of the mobile device, namely the application, data link, and physical layers.

Further, the term "techniques," as used herein, may refer to system(s), method(s), computer-readable instruction(s), module(s), algorithms, hardware logic, and/or operation(s) as permitted by the context described above and through the document.

Figure 1B:
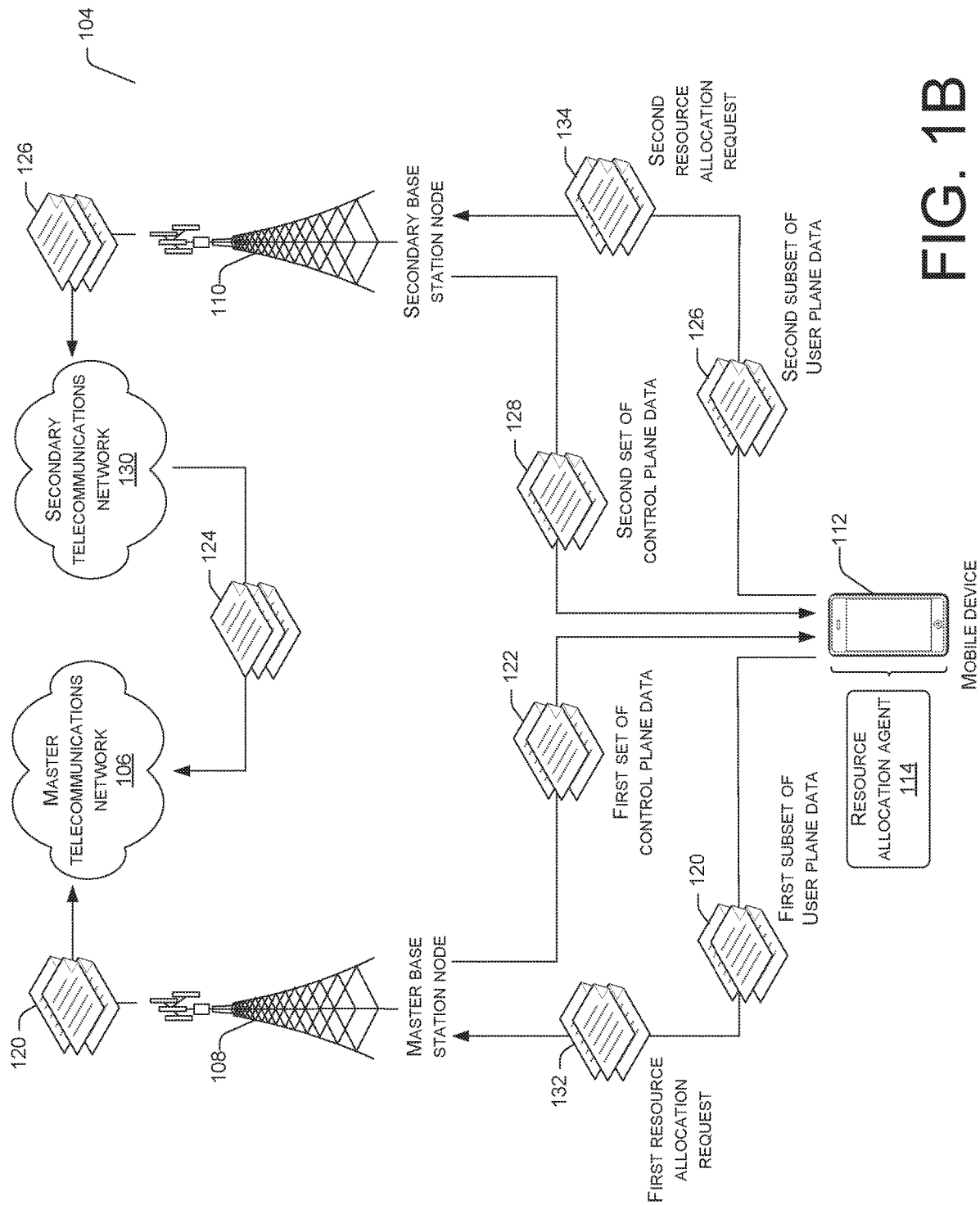

FIGS. 1A and 1B illustrate computing environments that facilitate the simultaneous uplink transmission of subsets of user plane data to a telecommunications network. FIG. 1A illustrates a schematic view of an NSA computing environment 102 configured for a Non-Stand Alone (NSA) deployment of a new Radio Access Technology (RAT), and FIG. 1B illustrates a schematic view of an SA computing environment 104 configured for a Stand Alone (SA) computing environment of a new RAT.

Referring to FIG. 1A, the NSA computing environment 102 encompasses deploying a new RAT by leveraging the infrastructure of a legacy RAT. For example, a telecommunications service provider may choose to deploy a 5G-NR network in a new marketplace (i.e. geographic region). While the 5G-NR infrastructure (i.e. gNodeBs and 5GCs) is being built, the service provider may choose to leverage the use of an existing LTE infrastructure (i.e. eNodeBs and EPCs) to provide consumers with LTE coverage in areas where 5G-NR is lacking.

In this way, a new RAT (i.e. 5G-NR) can be introduced into the marketplace before its new infrastructure is deployed. Under the NSA deployment option, a master telecommunications network 106 is communicatively coupled to a master base station node 108 and secondary base station node(s) 110. It is noteworthy that the term "master telecommunications network 106" is used to describe the telecommunications network to which the mobile device 112 is subscribed, and to which the user plane data is ultimately transmitted. It is noteworthy that the common use of the term "master" in "master telecommunications network 106" and "master base station node 108" is intended to highlight the use of a common RAT between the telecommunications network and base station node. For example, if the master telecommunications network 106 is an LTE network, then the master base station node 108 is an eNodeB. In contrast, the term "secondary" as used in "secondary base station node" is intended to highlight the use of a different RAT relative to the master telecommunications network 106. For example, if the master telecommunications network 106 is a 5G-NR network, then the secondary base station node(s) 110 is an eNodeB. Even though FIG. 1A illustrates one secondary telecommunications network, and by extension, one secondary base station node, further variations, and modifications can be made such that multiple secondary telecommunications network(s), and by extension multiple, secondary base station node(s) 110, may be incorporated into the NSA computing environment 102.

In the illustrated example, a resource allocation agent 114 that resides on the mobile device 112 may detect an impending uplink transmission to the master telecommunications network 106. The resource allocation agent 114 may generate one or more subsets of user plane data within a buffer pool on the mobile device 112, and in doing so, generate a resource allocation request 116 for the uplink transmission of the subsets of user plane data to the master telecommunications network 106.

Uplink transmissions to the master telecommunications network 106 occur via the available RAT spectrum at the master base station node 108 and the secondary base station node(s) 110. The master base station node 108 orchestrates a resource allocation of available RAT spectrum at the master base station node 108 and the secondary base station node(s) 110. For example, the resource allocation controller 118 at the master base station node 108 may detect receipt of a resource allocation request 116 to transmit user plane data from the mobile device 112 to the master telecommunications network 106. As described earlier, the resource allocation request 116 may include an indication of subsets of user plane data that are to be transmitted to the master telecommunications network 106. The master base station node 108 may then coordinate with the secondary base station node(s) 110 to schedule resource allocations that collectively account for an entirety of the user plane data.

For example, the resource allocation controller 118 of the master base station node 108 may schedule its resource allocation to transmit a portion of the user plane data (i.e. a first subset of user plane data 120) to the master telecommunications network 106 and, in doing so, transmit a first set of control plane data 122 to the mobile device 112 indicating the same. The first set of control plane data 122 provides the mobile device 112 with physical resource block (PRB) assignments for the uplink transmission of the first subset of user plane data 120 to the master telecommunications network 106. The PRB assignments correspond to the RAT spectrum serviced by the master base station node 108. For example, for an LTE network, the assignment of PRB resources occurs within the LTE spectrum of an eNodeB. For a 5G-NR network, the assignment of PRB resources occurs within the 5G-NR spectrum of a gNodeB.

Also, the resource allocation controller 118 of the master base station node 108 may interact with secondary base station node(s) 110, via an additional resource allocation request 124, to schedule an uplink transmission of the remaining portion of the user plane data (i.e. second subset of user plane data 126) to the master telecommunications network 106. In the illustrated example of FIG. 1A, the secondary base station node(s) 110 may transmit a second set of control plane data 128 associated with the scheduled resource allocation for the uplink transmission of the second subset of user plane data 126 to the master base station node 108. The master base station node 108 may forward the second set of control plane data 128 to the mobile device 112. In an alternative embodiment, the secondary base station node(s) 110 may transmit the second set of control plane data 128 directly to the mobile device 112, and in doing so, provide the master base station node 108 with an acknowledgment that the resource allocation request has been fulfilled.

At the mobile device 112, in response to receipt of the first set of control plane data 122 and the second set of control plane data 128, the resource allocation agent 114 that resides on the mobile device 112 may facilitate a simultaneous uplink transmission of user plane data to the master telecommunications network 106. More specifically, the mobile device may transmit a first subset of user plane data 120 via the master base station node 108 to the master telecommunications network 106, and simultaneously, a second subset of user plane data 126 via the secondary base station node(s) 110 to the master telecommunications network 106. In some examples, the subsets of user plane data may reside within the buffer pool of the mobile device 112 until control plane data is received from the master base station node 108 and the secondary base station node(s) 110. This delay in allocating user plane data to buffer queues may occur because in some cases, the buffer queues reside on hardware interface components of the mobile device's RAT interface. Once the control plane data is received, the resource allocation agent 114 may allocate subsets of user plane data from the buffer pool to the buffer queues associated with each RAT spectrum at the data link layer or physical layer of the mobile device 112.

In the illustrated example, the master telecommunications network 106 may correspond to a Long-Term Evolution (LTE) network, however further variations and modifications can be made such that the resource allocation controller 118 and resource allocation agent 114 are executable on a 5G-New Radio (5G-NR) network, a 2G network, a 3G network, or any other communications protocol including Wi-Fi. The NSA computing environment 102 may include base station nodes, such as master base station node 108 and secondary base station node(s) 110. The base station nodes are responsible for handling voice and data traffic between core networks, such as the LTE and 5G core networks, and mobile device 112. The LTE and 5G-NR core networks provide telecommunication and data communication services to multiple mobile devices, such as LTE-compatible mobile devices, 5G-NR compatible mobile devices, and mobile devices that LTE and 5G-NR compatible.

Further, the resource allocation controller 118 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the mobile device 112 via one or more network(s). The one or more network(s) may include public networks such as the Internet, private networks such as an institutional and/or personal intranet, or some combination of private and public network(s). The one or more network(s) can also include any type of wired and/or wireless network, including but not limited to local area network (LANs), wide area network(s) (WANs), satellite networks, cable networks, Wi-Fi networks, Wi-Max networks, mobile communications networks (i.e. 5G-NR, LTE, 3G, 2G), or any combination thereof.

The mobile device 112 may include any sort of electronic device, such as a cellular phone, a smartphone, a tablet computer, an electronic reader, a media player, a gaming device, a personal computer (PC), a laptop computer, etc. The mobile device 112 may include a subscriber identity module (SIM), such as an eSIM, to identify the mobile device 112 to a telecommunication service provider (also referred to herein, as "telecommunications network").

FIG. 1B illustrates a schematic view of an SA computing environment 104 that facilitates the simultaneous an uplink transmission of subsets of user plane data to a telecommunications network via an SA deployment of a new RAT.

The SA computing environment 104 described in FIG. 1B includes various details relating to the simultaneous uplink transmission of subsets of user plane data to a telecommunications network that were previously described with reference to FIG. 1A. As such, for brevity and ease of description, various details relating to the simultaneous uplink transmission of subsets of user plane data have been omitted herein to the extent that the same or similar details have been provided with reference to FIG. 1A.

In contrast, to the NSA deployment of a RAT, a telecommunications service provider may choose to deploy a new RAT that does not leverage an existing deployment of a legacy RAT infrastructure, but instead only uses already-deployed new-RAT infrastructure. For example, under the SA deployment option, a 5G-NR-enabled mobile device may transmit user plane data to the 5GC core using 5G-NR infrastructure, namely gNodeB base stations. Unlike the NSA deployment option, the 5G-NR enabled mobile device cannot use LTE infrastructure, namely eNodeB, to transmit user plane data to the 5GC core.

Under the SA deployment option, the mobile device 112 that is configured to interact separately with multiple RATs, namely a master telecommunications network 106 and a secondary telecommunications network(s) 130. Note that the terms "master" and "secondary" as used with reference to the SA deployment option, highlight common RATs used between the telecommunications networks and their corresponding base station nodes.

In the illustrated example, the resource allocation agent 114 that resides on the mobile device 112 may detect an impending uplink transmission to a master telecommunications network 106. Similar to the NSA deployment option of FIG. 1A, the resource allocation agent 114 may generate one or more subsets of user plane data for an uplink transmission to the master telecommunications network 106. However, unlike the NSA deployment option, under the SA deployment option, the resource allocation agent 114 may generate individual resource allowable requests for delivery to base station node(s) associated with the master telecommunications network 106 and secondary telecommunications network(s) 130. In the illustrated example, the resource allocation agent 114 may generate a first resource allocation request 132 for the delivery to the master base station node 108 and a second resource allocation request 134 for delivery to the secondary base station node(s) 110. Even though FIG. 1B illustrates one secondary telecommunications network, and by extension, one secondary base station node, further variations, and modifications can be made such that multiple secondary telecommunications network(s) 130 may be incorporated into the SA computing environment 104.

In response to transmitting the resource allocation requests (i.e. first resource allocation request 132 and the second resource allocation request 134) to respective base station nodes (i.e. master base station node 108 and secondary base station node(s) 110), the mobile device 112 may receive a first set of control plane data 122 from the master base station node 108 and a second set of control plane data 128 from the secondary base station node(s) 110. Note that if a plurality of secondary base station node(s) 110 are engaged, the mobile device 112 is to receive an individual set of control plane data from each of the secondary base station node(s) 110.

Moreover, the mobile device 112 may simultaneously transmit the subsets of user plane data to each telecommunications network based on the sets of control plane data received from each base station node. For example, the mobile device 112 may transmit the first subset of user plane data 120 to the master telecommunications network 106 based on the first set of control plane data 122, and the second subset of user plane data 126 to the secondary telecommunications network(s) 130 based on the second set of control plane data 128.

It is noteworthy that to facilitate the simultaneous uplink transmission of user plane data, the resource allocation agent 114 may allocate subsets of user plane data to buffer queues at the data link layer or physical layer of the mobile device 112. The resource allocation agent 114 may also generate and deliver computer-executable instructions to secondary telecommunications network(s) 130, via the secondary base station node(s) 110, that causes the secondary telecommunications network(s) 130 to forward subsets of user plane data, such as the second subset of user plane data 126, to the master telecommunications network 106. In this way, the master telecommunications network 106 can aggregate the subsets of user plane data, such as the first subset of user plane data 120 and the second subset of user plane data 126, to re-form an entirety of the user plane data.

Figure 2A:
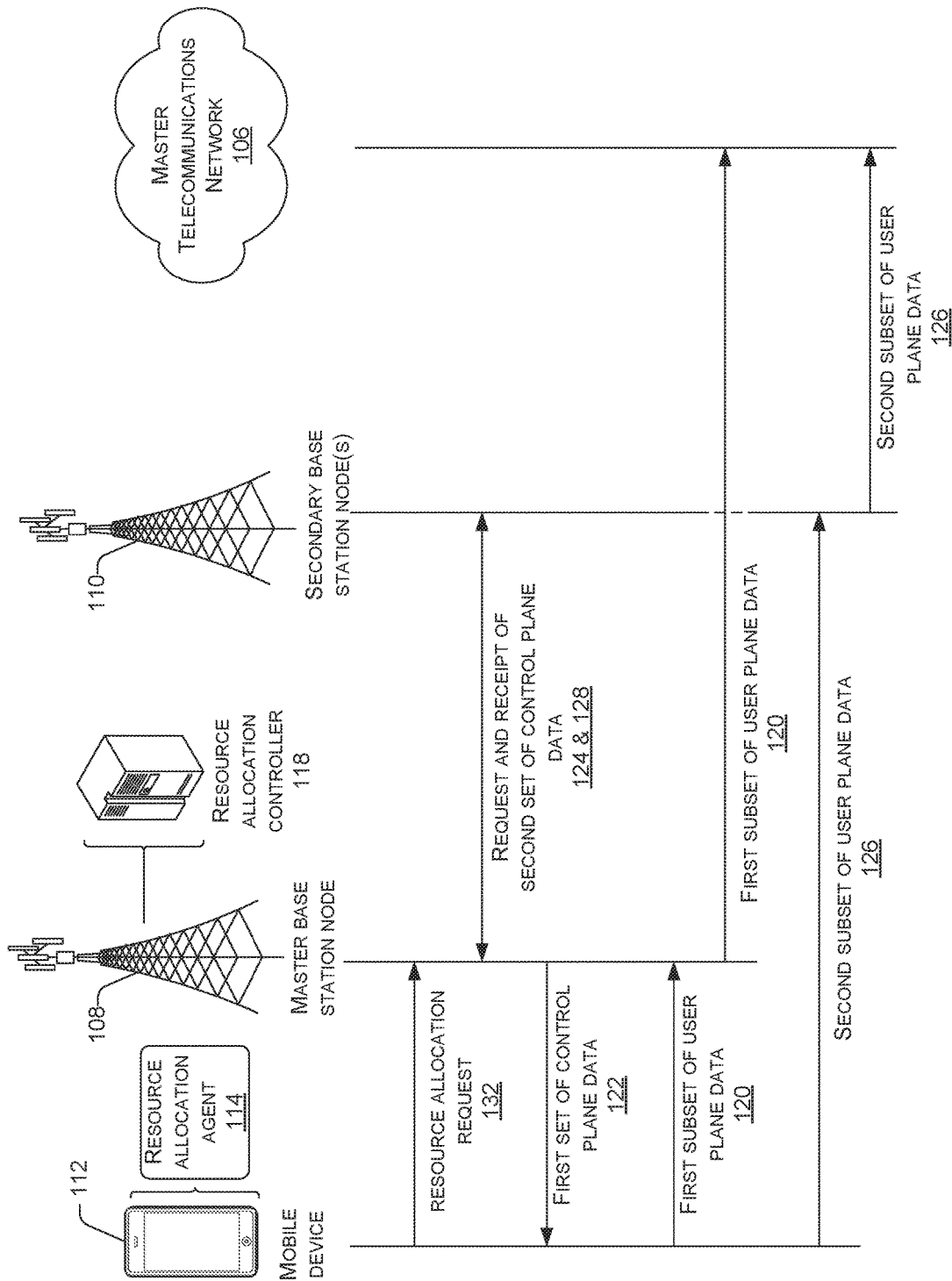
FIGS. 2A and 2B illustrate block diagrams of a resource allocation agent that facilitates the simultaneous uplink transmission of user plane data to a master telecommunications network via two or more RATs. More specifically.
Figure 2B:
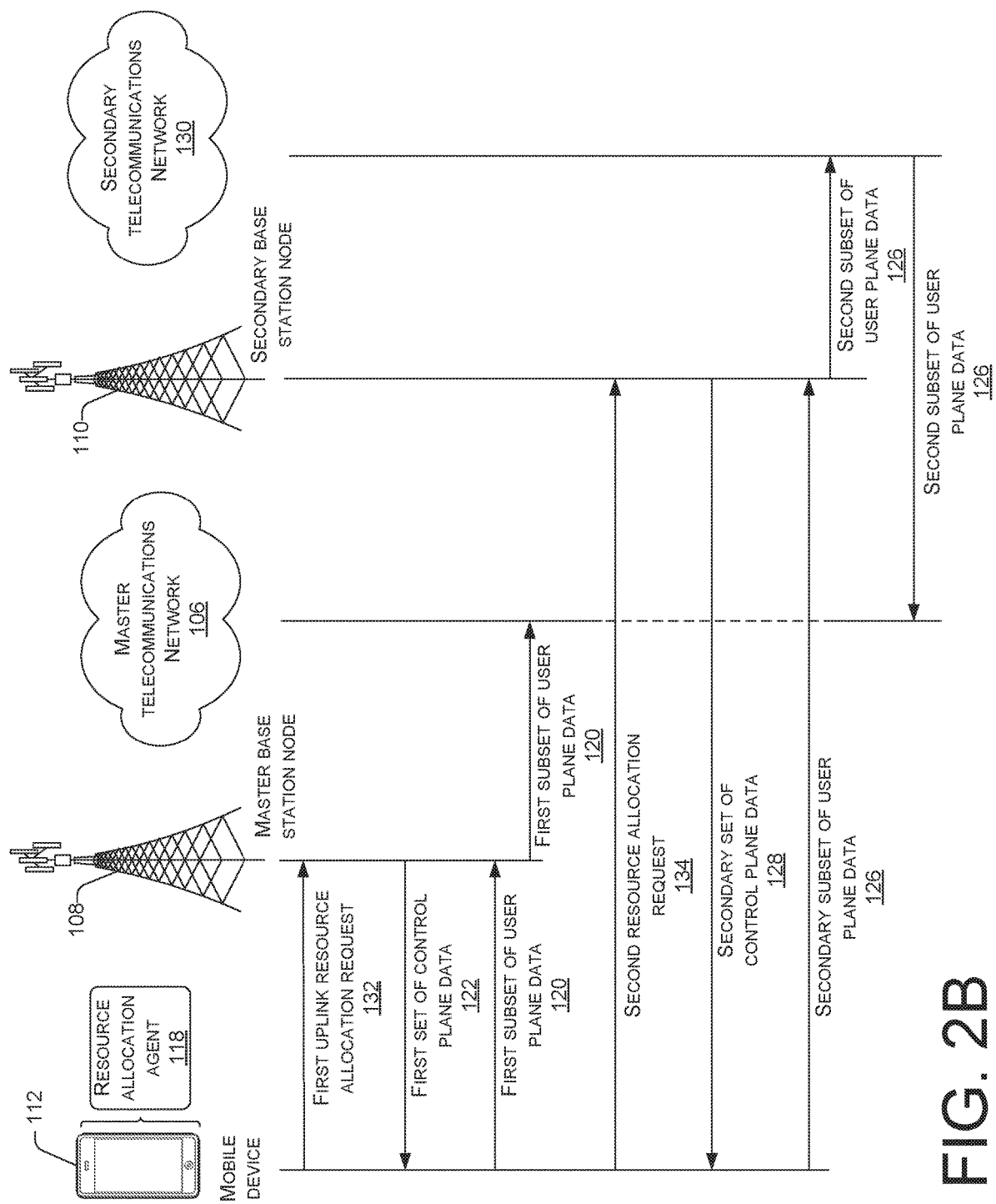

FIGS. 2A and 2B illustrate block diagrams of a resource allocation agent that facilitates the simultaneous uplink transmission of user plane data to the master telecommunications network via two or more RATs. More specifically, FIG. 2A illustrates a general flow of communications for an NSA deployment of a new RAT and FIG. 2B illustrates a general flow of communications for an SA deployment of a new RAT.

Referring to FIG. 2A, a resource allocation agent 114, native to a mobile device 112, may detect an impending uplink transmission of user plane data to a master telecommunications network 106. The resource allocation agent 114 may generate an uplink resource allocation request 116 for delivery to a resource allocation controller 118 of a master base station node 108. The master base station node 108 may employ the same RAT as the telecommunications network. For example, the master base station node 108 may correspond to an eNodeB for an LTE telecommunications network or a gNodeB for a 5G-NR telecommunications network. In other examples, the master base station node 108 may employ a different RAT to the telecommunications network.

The uplink resource allocation request 116 may include a request for spectrum resource allocation to transmit one or more subsets of user plane data to the master telecommunications network 106. Each subset of user plane data may be assigned a priority score, based on the factors such as QoS and QoE associated with the individual data packets within the subset.

The resource allocation controller 118 that resides at the master base station node 108 may analyze the uplink resource allocation request 116 and interact with secondary base station node(s) 110 located within the serviceable geographic region of the mobile device 112. The secondary base station node(s) 110 may employ a different RAT to the master base station node and the master telecommunications network 106. For example, the secondary base station node(s) 110 may correspond to a gNodeB, while the master base station node 108 corresponds to an eNodeB, and the master telecommunications network 106 corresponds to an LTE network. Similarly, the secondary base station node(s) 110 may correspond to an eNodeB, while the master base station node 108 corresponds to a gNodeB, and the telecommunications network corresponds to a 5G-NR network.

In response, the secondary base station node(s) 110 may schedule a resource allocation for an uplink transmission of subsets of user plane data from the mobile device 112 to the master telecommunications network 106 and communicate the same to the master base station node 108.

In doing so, the master base station node 108, via the resource allocation controller 118, may generate control plane data for delivery to the mobile device 112 that includes a first resource allocation for a first uplink transmission of user plane data via the master base station node 108, and additional resource allocations for the uplink transmission(s) of user plane data via the secondary base station node(s) 110. It is noteworthy that the user plane data transmitted via the master base station node 108 and the secondary base station node(s) 110 constitute subsets of user plane data that collectively account for substantially all of the user plane data intended for transmission by the mobile device 112 to the master telecommunications network 106.

In another embodiment, rather than the secondary base station node(s) 110 communicating a resource allocation to the master base station node 108, the secondary base station node(s) 110 may communicate the resource allocation directly to the mobile device 112 via separate instances of control plane data.

At the mobile device 112, upon receipt of the control plane data from the master base station node 108, and in some embodiments, the secondary base station node(s) 110, the resource allocation agent 114 may facilitate the simultaneous uplink transmission of subsets of user plane data via the master base station node 108 and the secondary base station node(s) 110. For example, a first subset of user plane data 120 may be transmitted to the master base station node 108 based at least in part on control plane data associated with the resource allocation scheduled by master base station node 108. The master base station node 108 may further transmit the first subset of user plane data 120 to the master telecommunications network 106.

A second subset of user plane data 126 is simultaneously transmitted to secondary base station node(s) 110 based at least in part on control plane data associated with the resource allocation scheduled by the secondary base station node(s) 110. The secondary base station node(s) 110 may further transmit the additional user plane data to the master telecommunications network 106.

At the master telecommunications network 106, the core network (i.e. EPC of an LTE network of 5GC of a 5G-NR network) may receive and aggregate the subsets of user plane data to re-form the original user plane data.

FIG. 2B illustrates an exemplary flow of communications a simultaneous uplink transmission of user plane data via two or more RATs under an SA deployment of a new RAT. In the illustrated example, the process flow for the uplink transmission of user plane data begins at a mobile device 112. More specifically, a resource allocation agent 114, native to the mobile device 112, may detect an impending uplink transmission of user plane data to a master telecommunications network 106. Under the SA deployment, each RAT (i.e. eNodeB and gNodeB) uses its infrastructure and spectrum to transmit user plane data to the telecommunications network. For example, a 5G network receives uplink transmissions from gNodeBs and not eNodeBs. Similarly, an LTE network receives uplink transmissions from eNodeBs and not gNodeBs.

In response to detecting an impending uplink transmission, the resource allocation agent 114 may divide the user plane data into two or more subsets of user plane data, at an application layer of the mobile device 112. The rationale by which the resource allocation agent 114 generates the subsets of user plane data is discussed in more detail with reference to FIGS. 4 and 6 of this disclosure. It is noteworthy that the buffer queues are located at the data link layer or the physical layer of the mobile device 112.

Further, the resource allocation agent 114 may generate two or more resource allocation requests for delivery to base station nodes that support telecommunication services at the geolocation of the mobile device 112. For example, an eNodeB may and gNodeB may each provide service coverage for their respective LTE and 5G networks at the geolocation of the mobile device 112. In the illustrated example, the mobile device 112 may transmit a first uplink resource allocation request 116 to a master base station node of a master telecommunications network 106 to which the mobile device 112 is subscribed, and a second uplink resource allocation request 116 to a secondary base station node of a secondary telecommunications network 130. The master telecommunications network 106 may employ a different RAT (i.e. LTE or 5G-NR) relative to the secondary telecommunications network(s) 130, the corollary of which is that corresponding base station nodes employ different RATs (i.e. eNodeBs and gNodeBs).

In this example, the master base station node 108 may receive the first uplink resource allocation request 116 and in response, return a first set of control plane data 122 that schedules a resource allocation (i.e. PRBs) for an uplink transmission of user plane data to the master telecommunications network 106. The resource allocation (i.e. PRBs) is associated with the radio spectrum of the master telecommunications network 106 (i.e. LTE for LTE network and 5G-NR for 5G-NR network), and by extension, the master base station node 108 (i.e. LTE for eNodeB and 5G-NR for gNodeB).

Similarly, the mobile device 112 may transmit a second uplink resource allocation request 116 to the secondary base station node(s) 110 of the secondary telecommunications network 130, and in return receive a second set of control plane data 128 that schedules a resource allocation for an uplink transmission of user plane data to the secondary telecommunications network 130.

In response to receiving the control plane data, the mobile device 112 may transmit a first subset of user plane data 120 to the master telecommunications network 106 via the master base station node 108. Upon receipt of the first subset of user plane data 120, the master base station node 108 may transmit the first subset of user plane data 120 to the master telecommunications network 106.

Similarly, the mobile device 112 may transmit a second subset of user plane data 126 to the secondary telecommunications network 130 via the secondary base station node(s) 110. Upon receipt, the secondary base station node(s) 110 may transmit the second subset of user plane data 126 to the secondary telecommunications network 130. The resource allocation agent 114 may generate and deliver computer-executable instructions with the second subset of user plane data 126 that causes the secondary telecommunications network 130 to transmit the second subset of user plane data 126 to the master telecommunications network 106. In this way, the first subset of user plane data 120 and the second subset of user plane data 126 can be aggregated at the master telecommunications network 106 to re-form an entirety of the user plane data.

Figure 3:
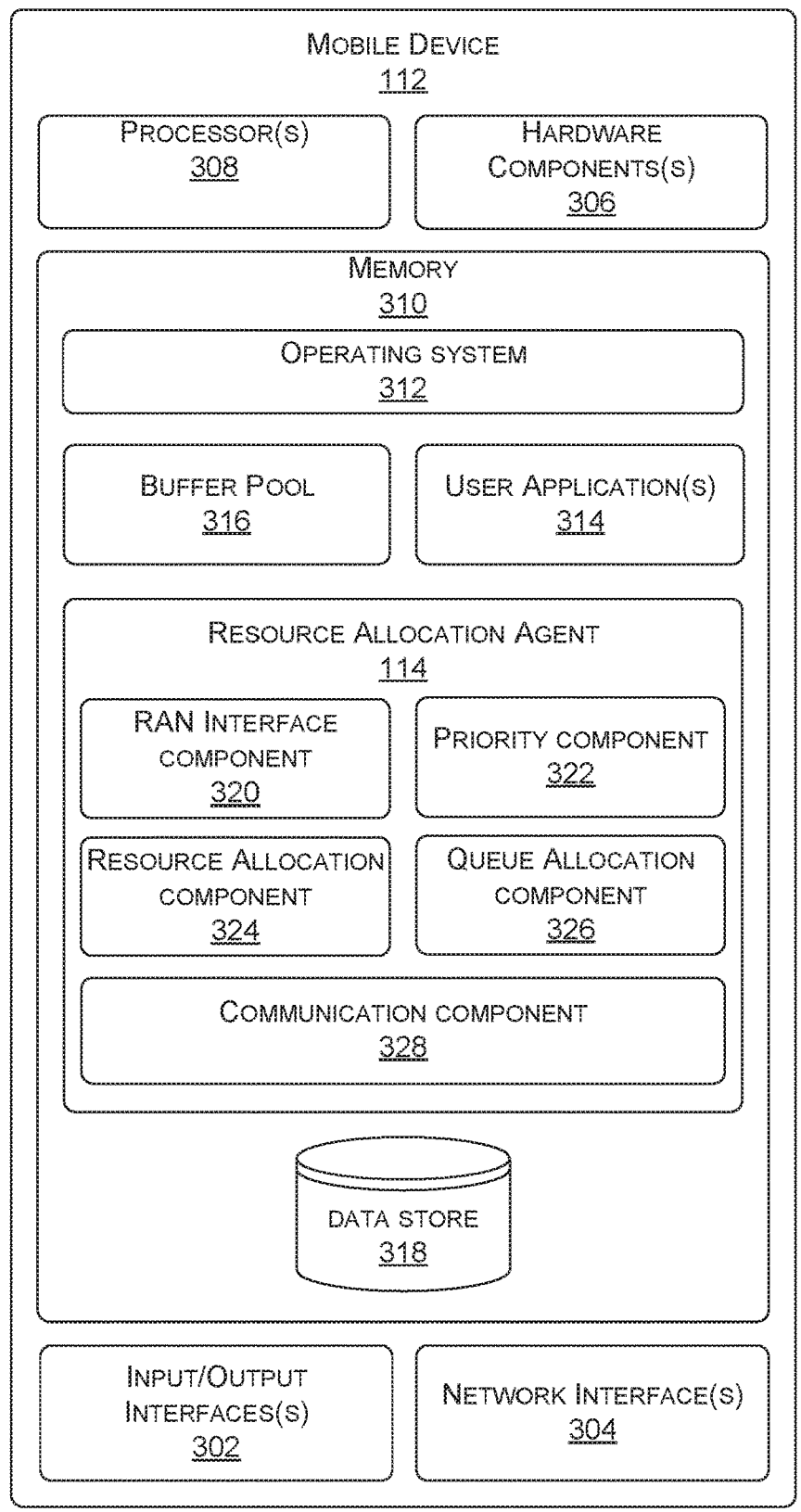
FIG. 3 illustrates a block diagram of various components of a mobile device with a resource allocation agent.

FIG. 3 illustrates a block diagram of various components of a mobile device with a resource allocation agent. The resource allocation agent may be configured to monitor receipt of user plane data within a buffer pool that resides on the mobile device, allocate subsets of user plane data to two or more buffers queues that reside on the mobile device, and facilitate the simultaneous transmission of subsets of user plane data to a telecommunications network via two or more RATs.

The mobile device 112 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the mobile device 112 may include network interface(s) 304. The network interface(s) 304 may include any sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the mobile device 112 may include one or more processor(s) 308 that are operably connected to memory 310. In at least one example, the one or more processor(s) 308 may be a central processing unit(s) (CPU), graphics processing unit(s) (GPU), or both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, user application(s) 314, a buffer pool 316, a resource allocation agent 114, and a data store 318. The operating system 312 may be any operating system capable of managing computer hardware and software resources. The operating system 312 may include an interface layer that enables applications to interface with the input/output interface(s) 302 and the network interface(s) 304.

The user application(s) 314 may correspond to any executable application or service on the mobile device 112. User application(s) 314 may rely on a communication medium to interact with the internet, via the network interface(s) 304. By way of example, user application(s) 314 may include multimedia applications, networking applications, communication applications, or gaming applications.

The buffer pool 316 may be configured to receive user plane data that is intended for an uplink transmission to the telecommunications network. The buffer pool 316 provides a medium within which the resource allocation agent 114 may analyze the user plane data before allocation to at least one buffer queue.

The resource allocation agent 114 may further comprise a RAN interface component 320, a priority component 322, a resource allocation component 324, a queue allocation component 326, and a communication component 328. The RAN interface component 320 may be configured to interface with one or more base station nodes that employ a different RAT, such as 2g, 3g, LTE, or 5G-NR. In one example, the RAN interface component 320 may transmit resource allocation requests to one or more base station node(s) and receive, control plane data that schedules a corresponding resource allocation.

The priority component 322 may be configured to determine a priority for data streams within the buffer pool 316. The priority may be represented as a priority score. The priority score may be alpha-numeric (i.e. 0 to 10, or A to F), descriptive, (i.e. low, medium, or high), based on color (i.e. green, yellow, or red), or any other suitable rating scale. A high priority score (i.e. 7 to 10, high, red) indicates that data packets correspond to prioritized real-time QoS or QoE applications or services. A medium priority score (i.e. 4 to 6, medium, yellow) indicates that data packets may impact real-time QoS or QoE applications or services. A low priority score (i.e. 1 to 3, low, green) indicates that data packets are unlikely to impact real-time QoS or QoE applications or services.

In one example, the priority component 322 may employ one or more trained machine-learning algorithms to determine a priority based on factors such as a QoS associated with the data stream, a QoE associated with the data stream, or a combination of both. QoS may relate to best-effort transmission designations, namely QoS5 through QoS9. QoE may relate to applications or services being executed in a foreground or background of a mobile device. The resource allocation agent may analyze current applications and services being executed on the mobile device relative to historical usage to infer a priority score. For example, a user may typically prioritize a streaming service over other data services that occur simultaneously. In this example, the resource allocation agent may assign the data stream associated with the streaming service with a higher priority score relative to the other data services.

The priority component 322 may infer application or service priority based on data captured from a user profile. The user profile may include a priority ranking of QoS transmissions based on historical records. Priority ranking may be generated using machine-learning algorithms based on historical data usage records. Alternatively, or additionally, the priority component 322 may monitor the usage of the mobile device 112 over a predetermined time interval. Over time, by employing machine-learning algorithms, the priority component 322 may infer whether a user typically prioritizes one application or service, such as interactive gaming (i.e. QoS7) over another, such as TCP-based video (i.e. QoS6). In doing so, corresponding priorities may be assigned based on the user's preferences (i.e. data streams associated with interactive gaming may be assigned a higher priority relative to data streams associated with the TCP-based video).

The analysis of QoE may be based on a granular hi-fidelity analysis of the historical usage of applications and services executed on a mobile device. For example, the resource allocation agent a particular application or service may receive a temporal high priority relative to other applications and services based on a user's prioritized use during particular times of day, days of the week, or geolocations of the mobile device. Outside those descriptors of usage, that same application or service may receive a lesser priority relative to other applications and services. Additionally, or alternatively, priority may be based on events (i.e. sports event, music event, etc.), irrespective of, or in combination with, the time of day, day of the week, or geolocation of the mobile device.

The priority component 322 may employ one or more trained machine learning algorithms to analyze QoS and QoE data. The one or more trained machine-learning algorithms may include but are not limited to algorithms such as supervised learning, unsupervised learning, semi-supervised learning, naive Bayes, Bayesian networks decision trees, neural networks, fuzzy logic models, multiclass decision forest, and/or probabilistic classification.

The resource allocation component 324 may be configured to generate a resource allocation request for spectrum resources to transmit user plane data to the telecommunications network. The resource allocation component may interrogate the buffer pool 316 to determine an amount of user plane data to transmit to the telecommunications network. Under the NSA deployment of a new RAT, one resource allocation request that corresponds to an entirety of user plane data within the buffer pool 316, is sent to the master base station node. Under the SA deployment of a new RAT, individual resource allocation requests are generated for delivery to base station nodes associated with each stand-alone telecommunications network.

Under the NSA and SA deployment of a new RAT, the resource allocation component 324 may rely on priority data generated by the priority component 322 to generate subsets of user plane data for transmission via two or more uplink transmissions. In this way, the resource allocation component 324 may generate resource allocation request(s) that are consistent with the generated subsets of user plane data. For example, consider a set of user plane data within the buffer pool 316. The set of user plane data may be partitioned into three subsets, based on corresponding QoS and/or QoE priorities. Under the NSA deployment of a new RAT, the resource allocation component 324 may generate a resource allocation request for delivery to the master base station node that requests an uplink transmission of three subsets of user plane data. In turn, the RAN interface component 320 may receive control plane data that partitions the transmission of the three subsets of user plane data between multiple uplink transmission paths. For example, one subset of user plane data may be transmitted to the telecommunications network via the master base station node, and the remaining two subsets of user plane data may be transmitted via secondary base station node(s).

Under the SA deployment of a new RAT, the resource allocation component 324 may generate resource allocation request(s) that preemptively partition the transmission of the three subsets of user plane data between multiple uplink transmission paths. For example, a first resource allocation request sent to the master base station node may request an uplink transmission of one subset of user plane data, and subsequent resource allocation requests sent to secondary base station node(s) may request the uplink transmission of the remaining two subsets of user plane data.

The queue allocation component 326 may be configured to facilitate the transmission of subsets of user plane data from the buffer pool 316 to one or more buffer queue(s), based at least in part on the control plane data. It is noteworthy that the buffer queue(s) are located at the data link layer or physical layer of the mobile device 112, and thus are represented in FIG. 3 within the network interface(s) 304 and Hardware component(s) 306. The queue allocation component 326 may compare subsets of user plane data within the buffer pool 316 to the control plane data received for each uplink transmission path, and in this way, allocate subsets of user plane data to uplink transmission path(s) based on available resources.

Under the SA deployment of a new RAT, the communication component 328 may be configured to generate computer-executable instructions that cause the secondary telecommunications network(s) to transmit subsets of user plane data to a master telecommunications network. In this way, the master telecommunications network may aggregate the subsets of user plane data to re-form an entirety of the user plane data.

It is noteworthy that under the NSA deployment of a new RAT, the secondary base station node(s) are configured to transmit subsets of user plane data to the master telecommunications network. Refer to FIG. 1A for further details. Therefore, an instruction from the communication component 328 to the secondary base station node(s) is redundant.

The data store 318 may include a repository of user profiles associated with the mobile device, historical usage of applications and services on the mobile device, and any other data pertinent to an operation of user application(s) 314 of the resource allocation agent 114.

Figure 4:
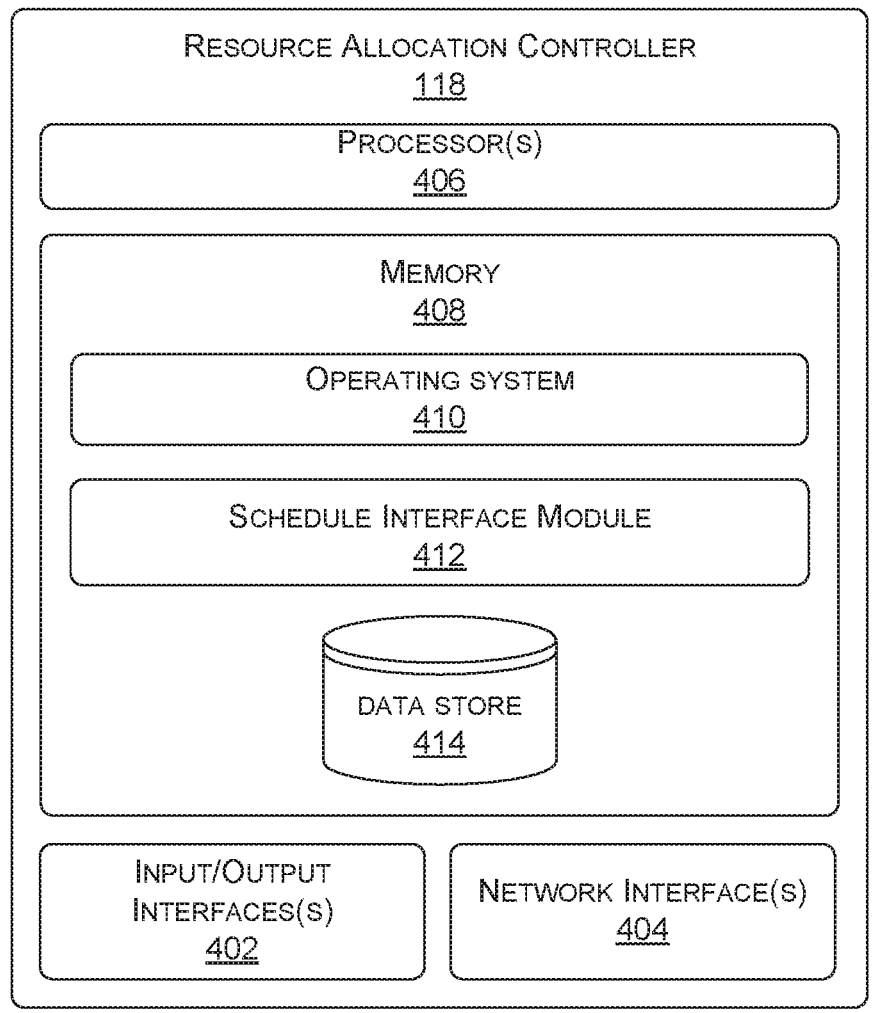
FIG. 4 illustrates various components of a resource allocation controller that resides on a base station node.

FIG. 4 illustrates various components of a resource allocation controller that resides on a base station node. The resource allocation controller 118 may be configured to determine a schedule of resource allocation for simultaneous uplink transmission of subsets of user plane data via one or more base station node(s) under the NSA deployment of a new RAT. In the illustrated example, the resource allocation controller 118 resides on a master base station node of a telecommunications network and thus is responsible for communicating with secondary base station node(s) to determine available uplink transmission resources.

The resource allocation controller 118 may include input/output interface(s) 402 and network interface(s) 404. The input/output interface(s) 402 may be similar to input/output interface(s) 302, and the network interface(s) 404 may be similar to network interface(s) 304.

The resource allocation controller 118 may include one or more processor(s) 406 that are operably connected to memory 408. The one or more processor(s) 406 may be similar to the one or more processor(s) 308, and the memory 408 may be similar to the memory 310.

The memory 408 may include an operating system 410, a schedule interface module 412, and a data store 414. The operating system 410 may be any operating system capable of managing computer hardware and software resources. The operating system 410 may include an interface layer that enables applications to interface with the input/output interface(s) 402 and the network interface(s) 404.

The schedule interface module 412 may be configured to detect receipt of a resource allocation request from a mobile device to a base station node, for simultaneous uplink transmission of subsets of user plane data via one or more uplink transmission paths. The resource allocation request may include a reference to multiple subsets of user plane data that are to be transmitted via the uplink transmission paths. In the illustrated example, the resource allocation controller 118 may reside on a master base station node configured to operate under an NSA deployment of a new RAT. Therefore, the schedule interface module 412 is configured to transmit resource allocation requests to secondary base station node(s) that service the same geographic region.

The secondary base station nodes may employ a different RAT. For example, the master base station node may be an eNodeB (i.e. LTE telecommunications network) and a secondary base station node may be a gNodeB (i.e. 5G-NR telecommunications network).

The resource allocation request sent to the secondary base station node(s) may include a resource allocation request for specific subsets of user plane data, identified from the original resource allocation request from the mobile device.

In doing so, the secondary base station node(s) may schedule a resource allocation for an uplink transmission from the mobile device to the telecommunications network, based on the resource allocation request received from the schedule interface module 412 (i.e. master base station node). The schedule interface module 412 may communicate the scheduled resource allocation, as control plane data, to the mobile device.

Alternatively, the schedule interface module 412 may include additional instructions that cause the secondary base station node(s) to communicate a scheduled resource allocation, as control plane data, directly to the mobile device. In this embodiment, rather than the mobile device receiving one set of control plane data from the master base station node, the mobile device may receive separate instances of control plane data from the master base station node and the secondary base station node(s).

The data store 414 may include a repository of data pertinent to an operation of the resource allocation controller 118 and its modules.

Figure 5:
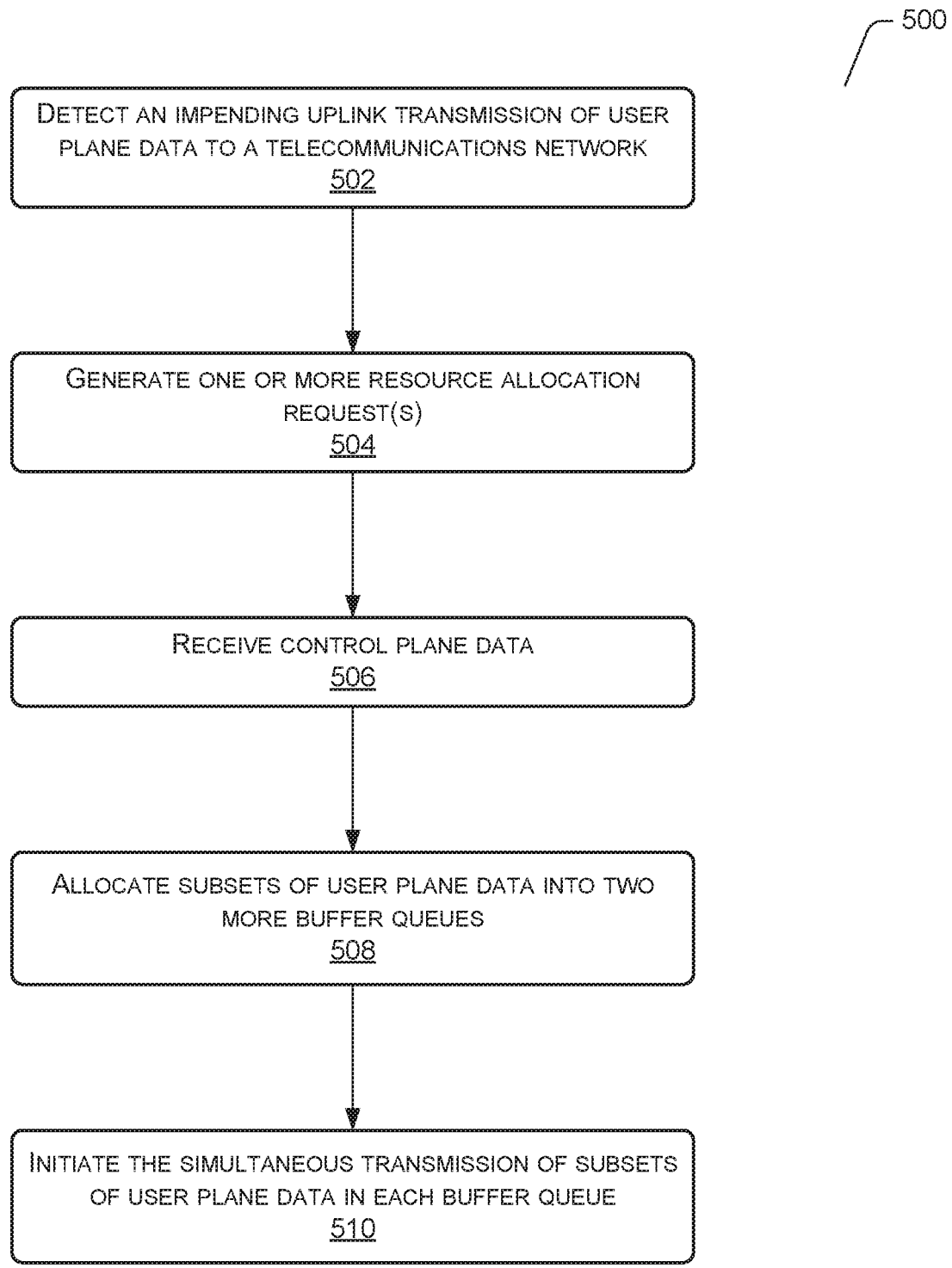
FIG. 5 illustrates a communications flow process that facilitates a simultaneously uplink transmission of two or more subsets of user plane data to a master telecommunications network via two or more Radio Access Technologies (RATs).
Figure 6:
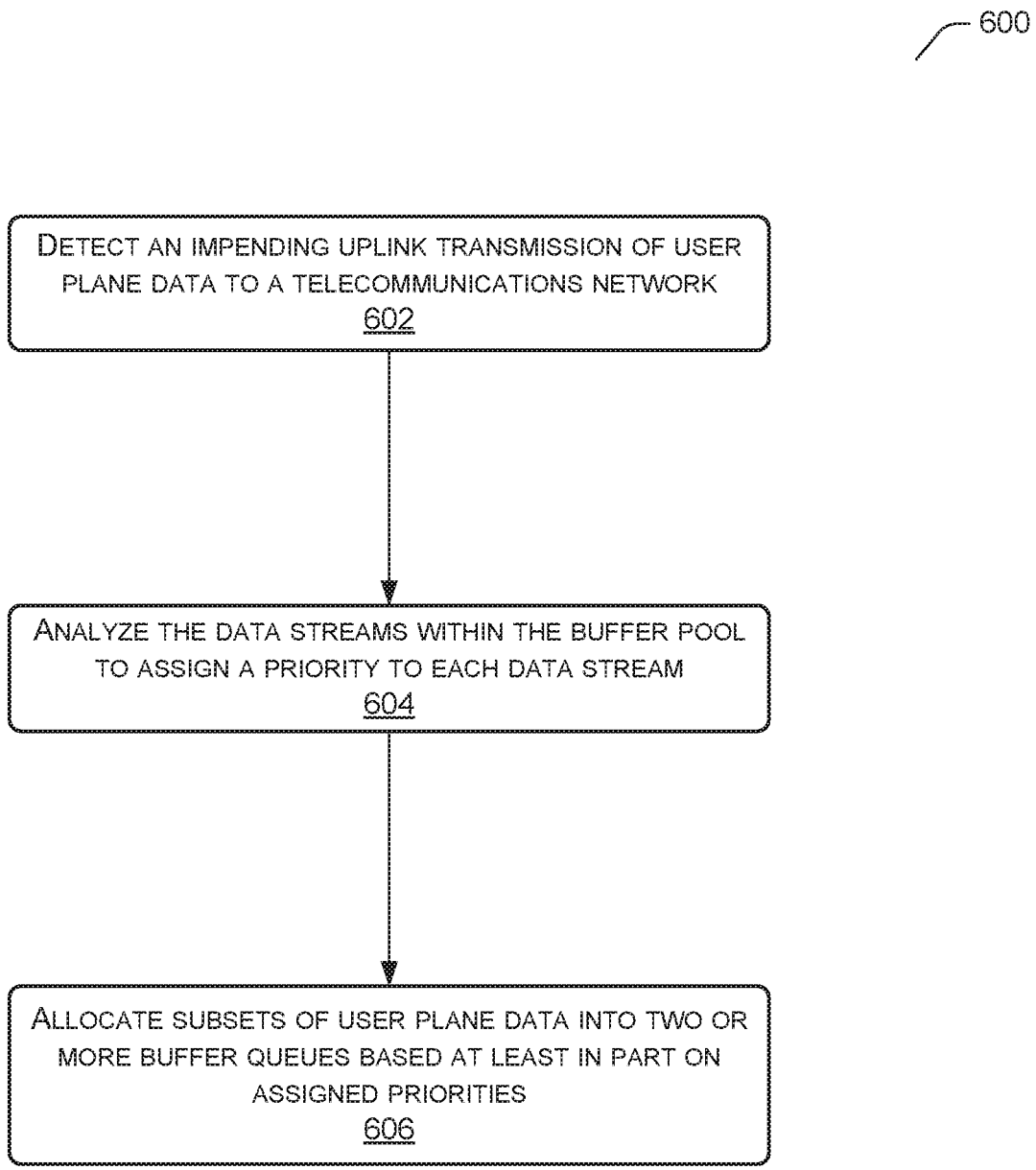
FIG. 6 illustrates a process flow for assigning subsets of user plane data to buffer queues for simultaneous transmission to a telecommunications network.

FIGS. 5 and 6 present processes 500 and 600 that relate to operations of the resource allocation agent that resides on a mobile device. Each of the processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the computing environment 100 of FIG. 1.

FIG. 5 illustrates a communications flow process that facilitates a simultaneously uplink transmission of two or more subsets of user plane data to a master telecommunications network via two or more Radio Access Technologies (RATs). More specifically, process 500 describes the process flow for SA and Non-SA deployment configurations for a new RAT and is described from the perspective of a resource allocation agent that resides on a mobile device.

At 502, a resource allocation agent may detect an impending uplink transmission of user plane data to a telecommunications network. The telecommunications network may correspond to a 2g, 3g, LTE, or 5G-NR telecommunications network. The user plane data may first queue an application layer buffer pool. At the buffer pool, the resource allocation agent may determine a priority for data streams that may be used to allocate subsets of the user plane data to buffer queues.

At 504, the resource allocation agent may generate one or more resource allocation requests for an uplink transmission of the user plane data to a telecommunications network.

Under an NSA deployment of a new RAT, the resource allocation agent may transmit one resource allocation request to a master base station node associated with the master telecommunications network.

Under an SA deployment a new RAT, the resource allocation agent may transmit individual resource allocation requests to base station nodes associated with each telecommunications network. For example, if the resource allocation agent of the mobile device detected two telecommunications networks (i.e. LTE and 5G-NR) that provide service coverage at the mobile device's geolocation, the resource allocation agent may transmit a resource allocation request to each of the two telecommunications networks.

At 506, the resource allocation agent may receive control plane data that schedules a simultaneous uplink transmission of the user plane data via two or more base station nodes. In this example, the two or more base station nodes may employ different RATs (i.e. LTE and 5G-NR). In one example, the resource allocation agent at the mobile device may receive one set of control plane data from the master base station node that includes resource allocations scheduled by the master base station node and secondary base station node(s). In this example, the master base station node may preemptively interact with secondary base station node(s) to determine and receive their schedule of resource allocation for user plane data. Upon receipt, the master base station node may transmit one set of control plane data to the mobile device that includes resource allocations associated with the master base station node and the secondary base station node(s).

In another example, the resource allocation agent at the mobile device may multiple sets of control plane data rather than one set of control plane data from the master base station node. Under the NSA deployment of a new RAT, the resource allocation agent may receive individual sets of control plane data from the master base station node and secondary base station node(s) in response to the resource allocation request sent to the master base station node. Additionally, under the SA deployment of a new RAT, the resource allocation agent may receive multiple sets of control plane data in response to each resource allocation request sent to each base station node.

At 508, the resource allocation agent may allocate subsets of user plane data into two or more buffer queues, based at least in part on the control plane data. Additionally, or alternatively, the allocation of subsets of user plane data may be based at least in part on an assigned priority. The buffer queues may be located at the data link or physical layers of the mobile device. More specifically, the buffer queues at the data link layer and physical layer reside on or interact directly with, the radio interface hardware component that transmits the subsets of user plane data.

It is noteworthy that at the application layer, the resource allocation agent at process step 504 determines a priority for data streams associated with the user plane data. A corollary priority is assigned to corresponding data frames at the data link layer or data packets at the physical layer.

At 510, the resource allocation agent may initiate the simultaneous transmission of subsets of user plane data in each buffer queue to the one or more base station nodes. Under the NSA deployment of a new RAT, the subsets of user plane data are delivered to the master telecommunications network from the master base station node and the secondary base station node(s). At the master telecommunications network, the core network may aggregate the subsets of user plane data to re-form the original user plane data.

Under the SA deployment of a new RAT, the subsets of user plane data are each delivered to respective telecommunication networks, namely the master telecommunications network and the secondary telecommunications network. In this example, the resource allocation agent may generate and deliver computer-executable instructions with each subset of user plane data sent to secondary base station node(s) that cause the secondary base station node(s) to transmit the subsets of user plane data to the master telecommunications network. In this way, the core network of the master telecommunications network may aggregate the subset of user plane data to re-form the original user plane data.

FIG. 6 illustrates a process flow for assigning subsets of user plane data to buffer queues for simultaneous transmission to a telecommunications network. Process 600 is described from the perspective of a resource allocation agent that resides on a mobile device.

At 602, the resource allocation agent may detect an impending uplink transmission of user plane data to a telecommunications network. The user plane data may first queue, as a data stream, at an application layer buffer pool on the mobile device.

At 604, the resource allocation agent may analyze the data streams within the buffer pool to assign a priority to each data stream. The priority may be assigned in the form of a priority score. The priority score may be alpha-numeric (i.e. 0 to 10, or A to F), descriptive, (i.e. low, medium, or high), based on color (i.e. green, yellow, or red), or any other suitable rating scale.

At 606, the resource allocation agent may allocate subsets of user plane data (i.e. data streams within the application layer buffer pool) into two or more buffer queues, based at least in part on assigned priorities. The allocation may be further based at least in part on the control plane data, as discussed earlier with reference to process 500. It is noteworthy that even though priorities are assigned to data streams within the application layer buffer pool, the assigned priority is carried through to corresponding data frames at the data link layer and corresponding data packets at the physical layer of the mobile device.

As part of allocating user plane data to two or more buffer queues, the resource allocation agent may consider the efficiency and reliability of the radio spectrum. In other words, the resource allocation agent may allocate a subset of user plane data with the highest priority to a buffer queue associated with the most efficient and reliable radio spectrum. For example, a high priority subset of user plane data may be allocated to a buffer queue associated with the 5G-NR spectrum, which is seemingly more efficient and reliable that the LTE spectrum. Recall that buffer queues at the data link layer and physical layer reside on or interact directly with, the radio interface hardware component of a particular radio spectrum (i.e. LTE, 5G-NR, etc.).

Additionally, the resource allocation agent may allocate the same subset of user plane data to two or more buffer queues for simultaneous transmission to the telecommunications network. Doing so provides user plane data with a measure of redundancy that protects against packet loss. In some examples, the resource allocation agent may compare the priority score of a subset of user plane data with a predetermined priority threshold. If the priority score is greater than or equal to the predetermined priority threshold, the resource allocation agent may employ the redundancy measure of duplicating the transmission of user plane data to the telecommunications network, to protect against packet loss. In doing so, if one uplink transmission path fails, the subset of user plane data can still be received by the telecommunications network via the other uplink transmission path. The core network of the telecommunications network may be configured to detect duplicate transmissions of the same subset of user plane data if multiple uplink transmissions of the same subset of user plane data are successful.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A mobile device, comprising:
one or more processors;
memory coupled to the one or more processors, the memory including one or more modules that are executable by the one or more processors to:
receive, within a buffer pool, user plane data for an uplink transmission to a master telecommunications network;
transmit, to a first base station node, a resource allocation request for the uplink transmission of the user plane data;
receive, from the first base station node, control plane data associated with the uplink transmission, based at least in part on the resource allocation request;
determine a priority for individual data packets of the user plane data;
parse the user plane data into at least a first subset of user plane data or a second subset of user plane data based at least in part on the priority; and
transmit, simultaneously, the first subset of user plane data to the first base station node and the second subset of user plane data to a second base station node, based at least in part on the control plane data.

2. The mobile device of claim 1, wherein the first base station node is associated with a first radio access technology and the second base station node is associated with a second radio access technology that is different from the first radio access technology.

3. The mobile device of claim 1, wherein the one or more modules are further executable by the one or more processors to:
generate a first buffer queue and a second buffer queue; and
allocate, from the buffer pool, a portion of the user plane data to the first buffer queue and a remaining portion of the user plane data to the second buffer queue, and
wherein to transmit the first subset of user plane data occurs from the first buffer queue and to transmit the second subset of user plane data occurs from the second buffer queue.

4. The mobile device of claim 1, wherein one or more modules are further executable by the one or more processors to:
determine a Quality of Service (QoS) associated with the individual data packets of the user plane data, the QoS corresponding to types of non-guaranteed bit-rate data, and
wherein, the priority is based at least in part on the QoS.

5. The mobile device of claim 1, wherein the one or more modules further executable by the one or more processors to:

determine a quality of experience (QoE) associated with the individual data packets of the user plane data, the QoE being associated with applications being executed in a foreground or a background of the mobile device, and wherein, the priority is based at least in part on the QoE.

6. The mobile device of claim 1, wherein the one or more modules further executable by the one or more processors to:

generate a subset group of the individual data packets, based at least in part on the priority of the individual data packets within the subset group being greater than a predetermined priority threshold; and allocate the subset group of the individual data packets to one of the first subset of user plane data or the second subset of user plane data.

7. The mobile device of claim 1, wherein the control plane data includes a first set of control plane data for the uplink transmission via the first base station node and a second set of control plane data for the uplink transmission via the second base station node.

8. The mobile device of claim 1, wherein the one or more modules are further executable by the one or more modules are further executable by the one or more processors to:

generate computer-executable instructions for delivery to the second base station node that cause the second base station node to transmit the second subset of user plane data to the master telecommunications network.

9. The mobile device of claim 1, wherein the second base station node is associated with a secondary telecommunications network that is different from the master telecommunications network, and wherein the one or more modules are further executable by the one or more processors to:

transmit, to the second base station node, an additional resource allocation request; and receive, from the second base station node, additional control plane data, and wherein, to transmit the second subset of user plane data to the second base station node is further based at least in part on the additional control plane data.

10. The mobile device of claim 9, wherein the one or more modules are further executable by the one or more processors to:

generate computer-executable instructions for delivery to the second base station node that cause the secondary telecommunication network to transmit the second subset of user plane data to the master telecommunications network.

11. A computer-implemented method, comprising:
under control of one or more processors:

transmitting, to a master base station node, a resource allocation request for an uplink transmission of user plane data to a master telecommunications network;

receiving, from the master base station node, control plane data associated with the uplink transmission;

determining a priority for individual data packets of the user plane data;

parsing the user plane data into at least a first subset of user plane data or a second subset of user plane data based at least in part on the priority; and transmitting, simultaneously, the first subset of user plane data to the master base station node, and the second subset of user plane data to a secondary base station node associated with a secondary telecommunications network.

12. The computer-implemented method of claim 11, further comprising:

generating computer-executable instructions for delivery to the secondary base station node that cause the secondary base station node to transmit the second subset of user plane data to the master telecommunications network.

13. The computer-implemented method of claim 11, wherein the control plane data includes a first subset of control plane data that is associated with the uplink transmission of the first subset of user plane data to the master base station node, and further comprising:

transmitting, an additional resource allocation request to the secondary base station node for the uplink transmission of the second subset of user plane data to the master telecommunications network; and receiving, from the secondary base station node, a second subset of control plane data associated with the additional uplink transmission, and wherein, the control plane data further includes the second subset of control plane data.

14. The computer-implemented method of claim 11, further comprising:

generating a first buffer queue and a second buffer queue;

allocating, from a buffer pool, the first subset of user plane data to the first buffer queue based at least in part on the priority and the control plane data; and allocating, from the buffer pool, the second subset of user plane data to the second buffer queue, and wherein, transmitting the first subset of user plane data occurs from the first buffer queue and wherein, transmitting the second subset of user plane data occurs from the second buffer queue.

15. The computer-implemented method of claim 11, further comprising:

determining at least one of a QoS or a QoE associated with data streams of the user plane data, and wherein, the priority is based in part on at least one of the QoS or QoE.

16. One or more non-transitory computer-readable media collectively storing computer-executable instructions that, when executed with one or more processors, collectively cause computers to perform acts comprising:

receiving, within a buffer pool, user plane data for an uplink transmission to a telecommunications network;

determining a priority for individual data packets of the user plane data;

parsing the user plane data into at least a first subset of user plane data or a second subset of user plane data based at least in part on the priority; and transmitting the first subset of user plane data to a first base station node associated with the telecommunications network and the second subset of user plane data to a second base station node associated with the telecommunications network.

17. The one or more non-transitory computer-readable media of claim 16, wherein acts further comprise:

transmitting to the first base station node, a resource allocation request for the uplink transmission of the user plane data;

receiving, from the first base station node, control plane data associated with the uplink transmission, based at least in part on the resource allocation request, and wherein, transmitting the first subset of user plane data and the second subset of user plane data is based at least in part on the control plane data.

18. The one or more non-transitory computer-readable media of claim 16, wherein acts further comprise:
   determining a Quality of Service (QoS) associated with the individual data packets of the user plane data, the QoS corresponding to types of non-guaranteed bit-rate data, and
   wherein, the priority is based at least in part on the QoS.

19. The one or more non-transitory computer-readable media of claim 16, wherein acts further comprise:
   determining a quality of experience (QoE) associated with the individual data packets of the user plane data, the QoE being associated with applications being executed in a foreground or a background of the mobile device, and
   wherein, the priority is based at least in part on the QoE.

20. The one or more non-transitory computer-readable media of claim 16, wherein acts further comprise:
   generating computer-executable instructions for delivery to the second base station node that cause the second base station node to transmit the second subset of user plane data to the telecommunications network.

* * * * *